United States Patent
Beck et al.

(10) Patent No.: US 11,391,096 B2
(45) Date of Patent: Jul. 19, 2022

(54) INDUCTIVE COUPLING FOR ELECTRIC POWER TRANSFER TO ELECTRIC SUBMERSIBLE MOTOR

(71) Applicant: Halliburton Energy Services, Inc., Houston, TX (US)

(72) Inventors: David Christopher Beck, Broken Arrow, OK (US); Walter Dinkins, Tulsa, OK (US); Ryan Bridwell Ashbaugh, Broken Arrow, OK (US); Robert Charles De Long, Sand Springs, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 98 days.

(21) Appl. No.: 16/722,488

(22) Filed: Dec. 20, 2019

(65) Prior Publication Data

US 2021/0189805 A1 Jun. 24, 2021

(51) Int. Cl.
*E21B 43/12* (2006.01)
*E21B 17/02* (2006.01)
(Continued)

(52) U.S. Cl.
CPC .......... *E21B 17/028* (2013.01); *E21B 17/003* (2013.01); *E21B 43/128* (2013.01);
(Continued)

(58) Field of Classification Search
CPC .. E21B 43/128; E21B 17/028; E21B 17/0283; H02K 5/132
See application file for complete search history.

(56) References Cited

U.S. PATENT DOCUMENTS 5,455,573 A * 10/1995 Delatorre ................ E21B 47/13
340/854.8
7,336,199 B2 * 2/2008 Lasater ................... E21B 47/12
340/854.8
(Continued)

FOREIGN PATENT DOCUMENTS

CA 2513998 C 1/2006
EP 2569503 B1 6/2019
(Continued)

OTHER PUBLICATIONS

PCT Application Serial No. PCT/US2019/068182, International Search Report, dated Sep. 15, 2020, 6 pages.
(Continued)

*Primary Examiner* — Cathleen R Hutchins
(74) *Attorney, Agent, or Firm* — DeLizio, Peacock, Lewin & Guerra

(57) ABSTRACT

An electric submersible pump used to pump fluids inside a borehole during operation is described. The electric submersible pump and its motor can be powered using an inductive power coupling. The electric submersible pump comprises a sealed extension that houses a pickup inductive coil assembly that is electrically coupled to a power source at a surface of the borehole. Power runs through the primary inductive coil assembly and the primary inductive coil is positioned relative to the pickup inductive coil assembly such that the electrical current flowing in the primary inductive coil assembly from the power source and through the power cable induces a voltage in the pickup inductive coil assembly.

22 Claims, 14 Drawing Sheets

(51) Int. Cl.
  *H02K 5/132*   (2006.01)
  *H02K 5/10*   (2006.01)
  *E21B 17/00*   (2006.01)
  *H02J 50/12*   (2016.01)

(52) U.S. Cl.
  CPC ............... *H02J 50/12* (2016.02); *H02K 5/10* (2013.01); *H02K 5/132* (2013.01)

(56) References Cited

U.S. PATENT DOCUMENTS

| | | |
|---|---|---|
| 7,775,275 B2 | 8/2010 | Patel |
| 8,037,936 B2 | 10/2011 | Neuroth et al. |
| 9,347,311 B2 | 5/2016 | Xiao et al. |
| 9,466,420 B2 | 10/2016 | Van Gils et al. |
| 10,128,909 B2 | 11/2018 | Weaver et al. |
| 2007/0295504 A1 | 12/2007 | Patel |
| 2008/0223585 A1 | 9/2008 | Patel et al. |
| 2009/0211755 A1 | 8/2009 | Dyer et al. |
| 2010/0096140 A1* | 4/2010 | Mack ................... E21B 43/128 166/369 |
| 2017/0194088 A1 | 7/2017 | Massolini et al. |
| 2019/0136687 A1 | 5/2019 | Gray |

FOREIGN PATENT DOCUMENTS

| | | | |
|---|---|---|---|
| GB | 2416626 | * 1/2006 | ............. H01F 38/14 |
| GB | 2416626 A | 2/2006 | |
| WO | 2016149811 A1 | 9/2016 | |

OTHER PUBLICATIONS

PCT Application Serial No. PCT/US2019/068182, International Written Opinion, dated Sep. 15, 2020, 5 pages.

GCC Application No. 2020-40946, Office Action, dated Oct. 21, 2021, 3 pages.

\* cited by examiner

INDUCTIVE COUPLING FOR ELECTRIC POWER TRANSFER TO ELECTRIC SUBMERSIBLE MOTOR

TECHNICAL FIELD

The disclosure generally relates to the field of electrical submersible motors and more particularly to inductive power coupling for electrical submersible pump motors.

BACKGROUND

In the oil and gas industry, electrical submersible pump ("ESP") systems are used for the recovery of oil and gas from subsurface formations. An ESP system is often suspended vertically in a wellbore and are connected by a cable to a motor which drives the ESP system. In order to power the ESP system, electricity is generated from the surface and supplied to the ESP motor through a power cable that is connected to the motor by an electrical coupler or a pothead. A pothead is a type of insulated electrical terminal typically used for transitioning between a cable and an equipment through the process of "potting" or encapsulating the conductors inside the terminal's insulating material to exclude corrosive agents. The ESP system and other similar equipment are often deployed deep down the wellbore and are subjected to corrosive high-pressure/temperature environments. Components delivering power to the ESP systems need to be designed and manufactured to withstand these hostile conditions.

BRIEF DESCRIPTION OF THE DRAWINGS

Aspects of the disclosure may be better understood by referencing the accompanying drawings.

DESCRIPTION

Figure 1:
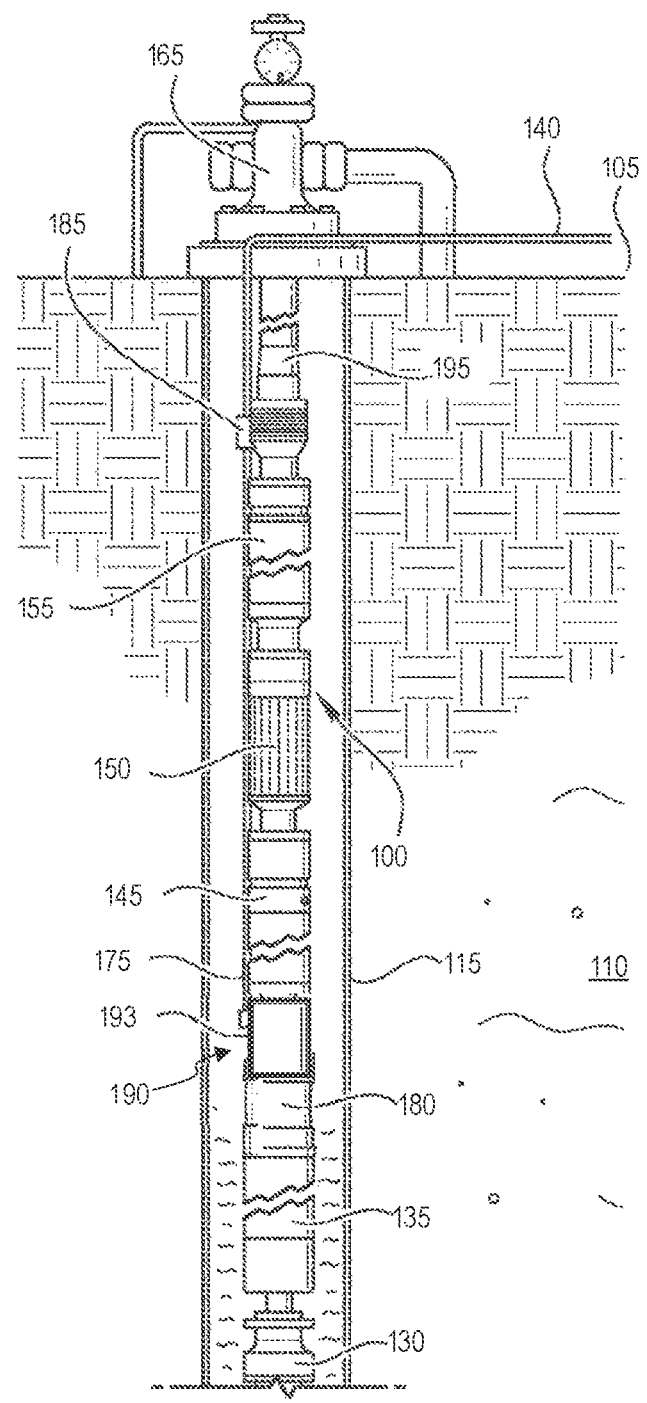
FIG. 1 depicts an example ESP assembly for downhole operations using inductive power coupling, according to some embodiments.

The description that follows includes example systems, methods, techniques, and program flows that embody aspects of the disclosure. However, it is understood that this disclosure may be practiced without these specific details. For instance, this disclosure refers to an ESP terminus located at the head of the ESP system in illustrative examples. Aspects of this disclosure can also be applied to terminus in various locations of the ESP system, such as the base of the lower motor. Furthermore, aspects of this disclosure can be applied to ESP systems consisting of a plurality of components such centralizers, check valves, shrouds, screens and filters, pumps, and motors. In other instances, well-known instruction instances, protocols, structures and techniques have not been shown in detail in order not to obfuscate the description.

Overview

Potheads are used as part of providing power to the ESP systems by connecting the power cable to the submersible pump. These potheads need to be designed to withstand hostile conditions downhole. Current potheads, whether tape-in or plug-in, can suffer damage from a myriad of causes: torsional or impact damage during run-in, chemical attacks on elastomer or metallic components of the pothead insulation, improper installation, wellbore fluid infiltration, degradation of elastomer, and other damaging phenomena. Damage to the pothead through any of the myriad of causes may create a pathway for wellbore fluid to enter into the motor, which can result in an electrical failure and other irreparable system failures requiring an extraction of the entire ESP system.

Instead of potheads, various embodiments include inductive power coupling to provide a more robust power connector. Inductive power coupling utilizes inductive power transfer to provide a sealed method of power transfer to the motor and eliminates any pathway for fluid ingress. An object that is sealed can be defined as having a complete or hermetic seal wherein the seal prevents any fluid ingress. Inductive power coupling also allows sealing of the motor frames and thereby provides a more robust structure for power transfer in comparison to potheads. Inductive power coupling can also facilitate installation by providing the ability to bolt the coupling into place around the outside of the motor rather than by taping in electrical leads (as used in tape-in potheads) or by installing a plug with all of the surrounding insulation material (as used in plug-in potheads). Inductive power coupling can also be designed to act as a downhole filter on electrical power supplied to the motor. It can serve as a filter for pulse width modulation or as a filter for unexpected transients/spikes in the supplied power, such as those caused by lightning strikes or poor power quality.

Furthermore, inductive coils within the coupling can be configured to modulate voltage and current that otherwise may be impossible to control in potheads with direct electrical connection. In the case of potheads with direct electrical connections, transformation happens above ground due to limitations in space downhole to place a typical transformer. In offshore applications where the surface on an offshore platform is limited, even the option of housing a typical transformer above ground on the offshore platform may not be optimal. Moreover, in order to achieve electrical transmission across a large distance downhole, the voltage across the power cable needs to be high which means that without a transformer downhole closer to the pump, the voltage may not be modulated at the terminus. With inductive power coupling, the inductive coils of the coupling can be configured to function as a transformer which allows greater control of the components in the ESP system. For example, the voltage may be stepped down using the inductive coupling to a level more reasonable in pump motors or may be stepped up to prevent cable overheating in restricted areas (e.g. packer pass-through). Inductive power coupling can allow reduction of surface space in environments where space is limited, such as in offshore applications, by removing the need for an above ground transformer. The coil circuits may be configured to provide filtering or modulation of the power supply to protect ESP system components. The sealed power transfer system using inductive coupling for ESP motors can greatly reduce pothead-associated failures and increase installation efficiency. The power filtering and modulation of the power supply downhole near the motor further can reduce stress placed on electrical components of the ESP system and can increase reliability.

In some embodiments, the inductive power coupling can include a cable terminus having a cylindrical case containing multiple inductive coils inside. The cable terminus can connect to a power cable and bolt onto one end of a motor for the ESP. In some embodiments, an extension of the motor can be sealed and can contain a set of inductive receiving coils disposed parallel to the coils inside the cable terminus. Electricity is generated above the surface and flows down the power cable to the coils inside the sealed walls of the cable terminus of the power coupling. Current in the inductive coils in the cable terminus can induce a voltage in the inductive coils in the extension of the motor. Such voltage can supply the power to the motor of the ESP. Using this inductive power coupling, power can be transferred to a motor via a sealed mechanism with no penetration into the motor casing or seals that may provide a leak path.

Example System

FIG. 1 depicts an example ESP assembly for downhole operations using inductive power coupling, according to some embodiments. An ESP assembly 100 may be located downhole inside a well that is bored below a surface 105. The well may, for example, be several hundred or a few thousand feet deep. The ESP assembly 100 may be vertical or horizontal and may be curved, bent and/or angled, depending on the well direction. The well may be an oil well, water well, and/or well containing other hydrocarbons, such as natural gas, and/or another production fluid from an underground formation 110. The ESP assembly 100 may be separated from the underground formation 110 by a well casing 115. Production fluid may enter the well casing 115 through casing perforations (not shown). Casing perforations may be either above or below an ESP intake 150. The ESP assembly 100 may include, from bottom to top, a downhole gauge 130 which can include one or more sensors that can detect and provide information such as motor speed, internal motor temperature, pump discharge pressure, downhole flow rate and other operating conditions. The sensor provides information to a user interface, variable speed drive controller, and/or data collection computer on surface 105. An ESP motor 135 may be an inductive motor, such as a two-pole, three phase squirrel cage inductive motor.

Upstream of the ESP motor 135 may be a motor protector 145, an ESP intake 150, an ESP system pump 155 and a production tubing 195. The motor protector 145 may serve to equalize pressure and keep the motor oil separate from well fluid. The ESP intake 150 may include intake ports and/or a slotted screen and may serve as the intake to the pump 155. The pump 155 may be a multi-stage centrifugal pump including stacked impeller and diffuser stages. Other components of ESP assemblies may also be included in the ESP assembly 100, such as a tandem charge pump (not shown) or gas separator (not shown) located between the pump 155 and the ESP intake 150 and/or a gas separator may serve as the pump intake. Shafts of the ESP motor 135, the motor protector 145, the ESP intake 150 and the pump 155 may be connected together (i.e., splined) and rotated by the ESP motor 135. The production tubing 195 may carry lifted fluid from the discharge of the pump 155 towards a wellhead 165.

An ESP cable 140 is electrically connected to an inductive power coupling 190 to ultimately provide power to the ESP motor 135. The ESP cable 140 extends from a power source (not shown) at the surface 105 to a cable terminus 193 of the power coupling. The ESP cable 140 spans the length of the well from the surface 105 to the set depth of the ESP motor 135. The cable terminus 193 of the power coupling surrounds the upstream end ("head") 180 of the ESP motor 135. In some embodiments, the cable terminus 193 may surround the bottom end of the ESP motor or other sections of the ESP motor in between. In other embodiments, the inductive power coupling may not be coupled to an ESP motor at all, but rather coupled to another component of the ESP system that relays the power generated to the motor indirectly. Power is transferred through the ESP cable to coils inside the cable terminus 193 of the inductive power coupling 190 which in turn induces current in a receiving inductive coil inside the ESP motor 135 and powers the motor. The ESP motor 135 may be completely sealed. Using this inductive power coupling, power can be transferred to a motor via a completely sealed mechanism with no penetration into the motor casing or seals that may be damaged to create a leak path.

Example Inductive Power Coupling

Figure 2:
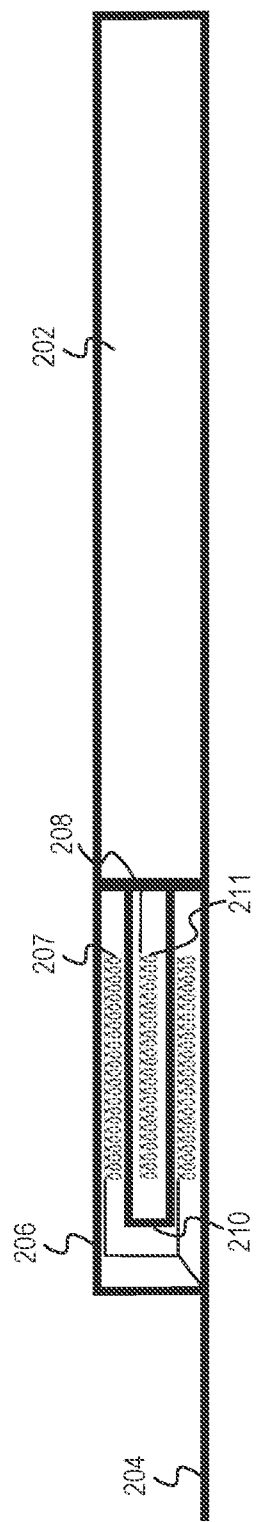
FIG. 2 depicts an example of an inductive power coupling integrated into an ESP system in a simplified diagram, according to some embodiments.

FIG. 2 depicts an example of an inductive power coupling integrated into an ESP system in a simplified diagram, according to some embodiments. An ESP cable 204, similar to the ESP cable 140 of FIG. 1, transmits power from a surface power supply to the inductive power coupling. In some embodiments, the ESP cable 140 may be used for communication in addition to functioning as a conduit for electricity. The ESP cable 204 attaches to a cable terminus 206 of the inductive power coupling. The cable terminus 206 is comprised of a hollow cylindrical sealed case with provisions for attachments to an end 208 of the downhole motor 202. The cylindrical sealed case in some embodiments may be partially hollow and may contain various components, such as insulation or electrical wiring, inside. The downhole motor 202 may be an inductive motor, such as a two-pole, three phase squirrel cage inductive motor, a permanent magnet motor, or other ESP motors. Moreover, the downhole motor 202 may be one of various classes of motors, such as radial flux, axial flux, and transverse flux motors, or a mix of such classes.

The cable terminus 206 is comprised of multiple inductive coil assemblies 207 ("primary coils") housed inside the cylindrical sealed case that make up the walls of the cable terminus 206. The ESP cable 204 attaches to the multiple inductive coil assemblies inside the cable terminus 206. Inductive coil assemblies are comprised of electromagnetic inductive coils that may be comprised of magnetic cores and associated electrical components, such as power regulators and filters. A sealed cylindrical extension 210 of the downhole motor 202 can be configured to be fitted within the cable terminus 206 and attaches to the cable terminus 206 at an end 208 of the downhole motor 202. The cable terminus 206 and the extension 210 form concentric cylinders wherein the cable terminus 206 surrounds and fits over the length of the extension 210. The sealed extension 210 may allow a shaft or rotor string to protrude downhole or uphole depending on the orientation. In some embodiments, the cable terminus 206 too may be hollow to allow the corresponding shaft or string to continue to extend through the cable terminus. The extension 210 of the downhole motor comprises inductive coil assemblies 211 inside the casing of the extension 210 ("pickup coils") attached to the motor windings. The primary coils 207 inside the cable terminus 206 and the pickup coils 211 are matched to generate current through the pickup coils that powers the ESP motor 202. The cable terminus 206 and the extension 210 can be attached to the ESP motor 202 in such a way to place the matched coils are in close proximity to each other.

Figure 3:
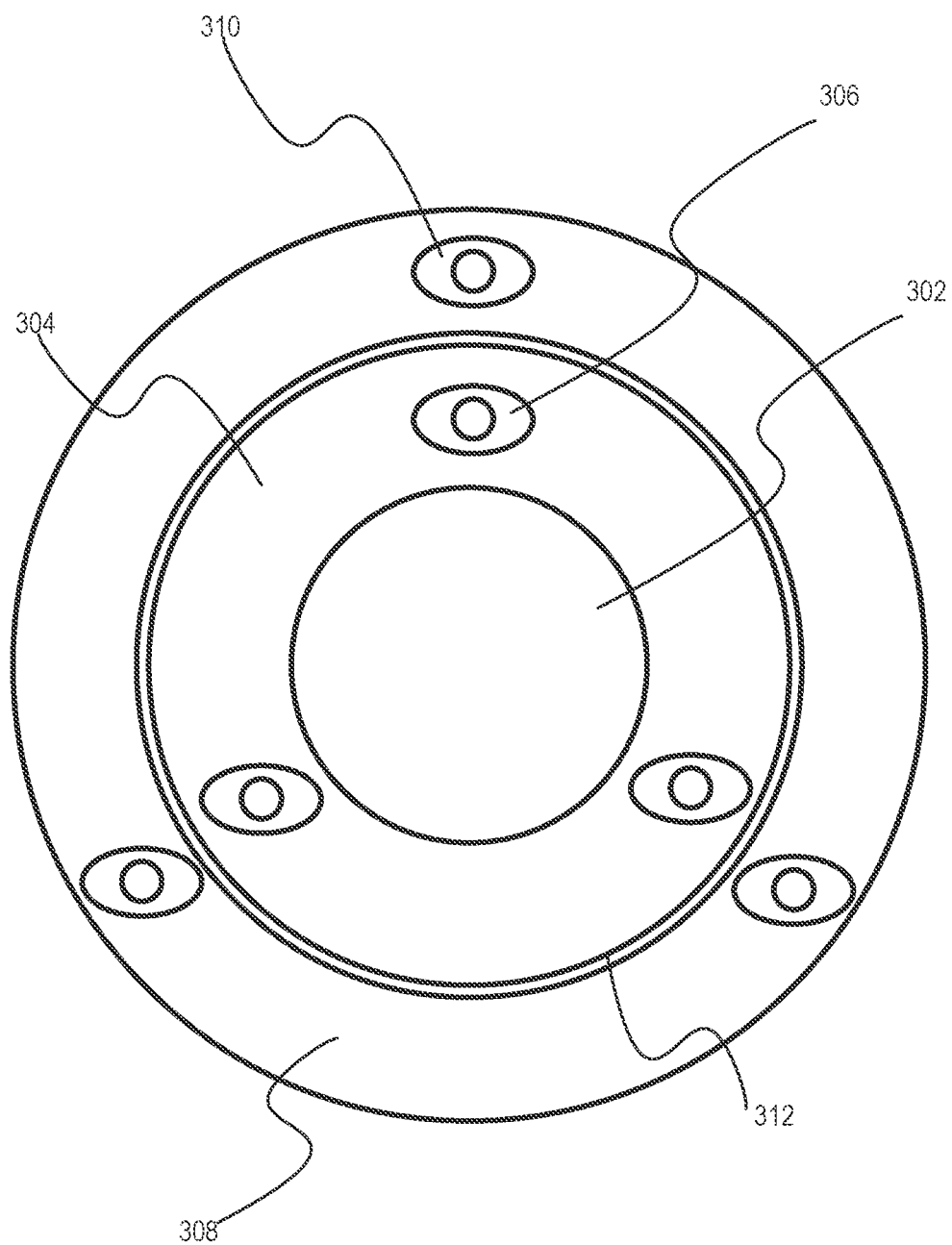
FIG. 3 depicts a cross-sectional view of an example arrangement of inductive coils inside the inductive power coupling, according to some embodiments.

FIG. 3 depicts a cross-sectional view of an example arrangement of inductive coils inside the inductive power coupling, according to some embodiments. In this arrangement, primary coils 310 are inside the sealed cylindrical case of the cable terminus 308 and are placed in a 90 degree offset from the each other. The center 302 of the extension sealed cylindrical extension 312 of the downhole motor may contain rotational components, such as a shaft or bearing systems. Pickup coils 306 are built into the end of the ESP motor stator 304 component in the extension 312 and remains stationary. Each of the primary coils 310 are matched with corresponding pickup coils 306 within the cable terminus 308 and the extension 312 respectively. The primary coils 310 and the pickup coils 306 may be configured to maximize efficiency and maximize even power transmission throughout the length of the coils. For example, instead of a section of a stator of the downhole motor, perpendicular coils maybe installed with a section of the rotor of the downhole motor also being replaced by matching coils that transfer power as shown in FIG. 2, FIG. 3 (shown end-wise), and FIGS. 8-12. Inductive power transmission may be improved based on the design of the coils, their relative positions and geometries with respect to one another. The coils may also be configured to modulate voltage/current by raising or lowering the induced voltage/current. In embodiments where the induced voltage/current is lowered, the pickup coils inside the extension of the ESP motor end may be shorter (with lower density of wire turns) or modified with other techniques common in transformer design. The decrease in the voltage applied to the motor may protect electrical components within the cable or motor or aid in reducing the ESP motor size by opening up multiple configuration options. Similarly, in embodiments where the induced voltage/current is increased, the pickup coils inside the cable terminus may be shorter (with lower density of wire turns) or modified with other techniques common in transformer design. Although FIG. 3 depicts a three pairs of inductive coils placed in a 90 degree offset from one another, other embodiments may contain various numbers and configurations of coils to transfer power to the ESP motor.

Figure 4:
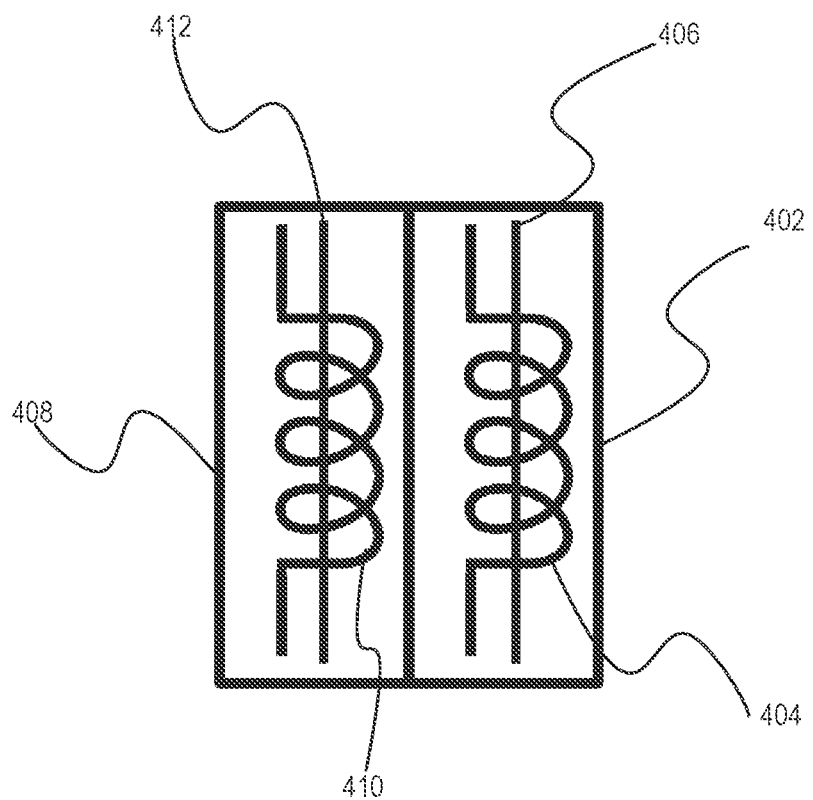
FIG. 4 depicts a simplified view of the inductive coil assemblies inside a cable terminus and the extension of the ESP motor, according to some embodiments.

FIG. 4 depicts a simplified view of the inductive coil assemblies inside the cable terminus and the extension of the ESP motor, according to some embodiments. The primary coils 410 and pickup coils 404 are contained within the walls of a cable terminus 408 and an extension 402 of the ESP motor respectively. The extension may be located at the ESP motor's stator component. The primary coils 410 and pickup coils 404 are located close in proximity in the vertical plane (axially along the length of the ESP motor) to generate sufficient voltage/current as well as to maximize efficiency. Additional electrical components may be incorporated into the inductive assemblies, such as a low pass filter for pulse width modulation, low/high pass filter for transient suppression, and other components that condition and modulate the power generated for the ESP motor. In some embodiments, the inductive coil assemblies may include magnetic cores 412, 406 in one or both of the primary coils and pickup coils.

Figure 5:
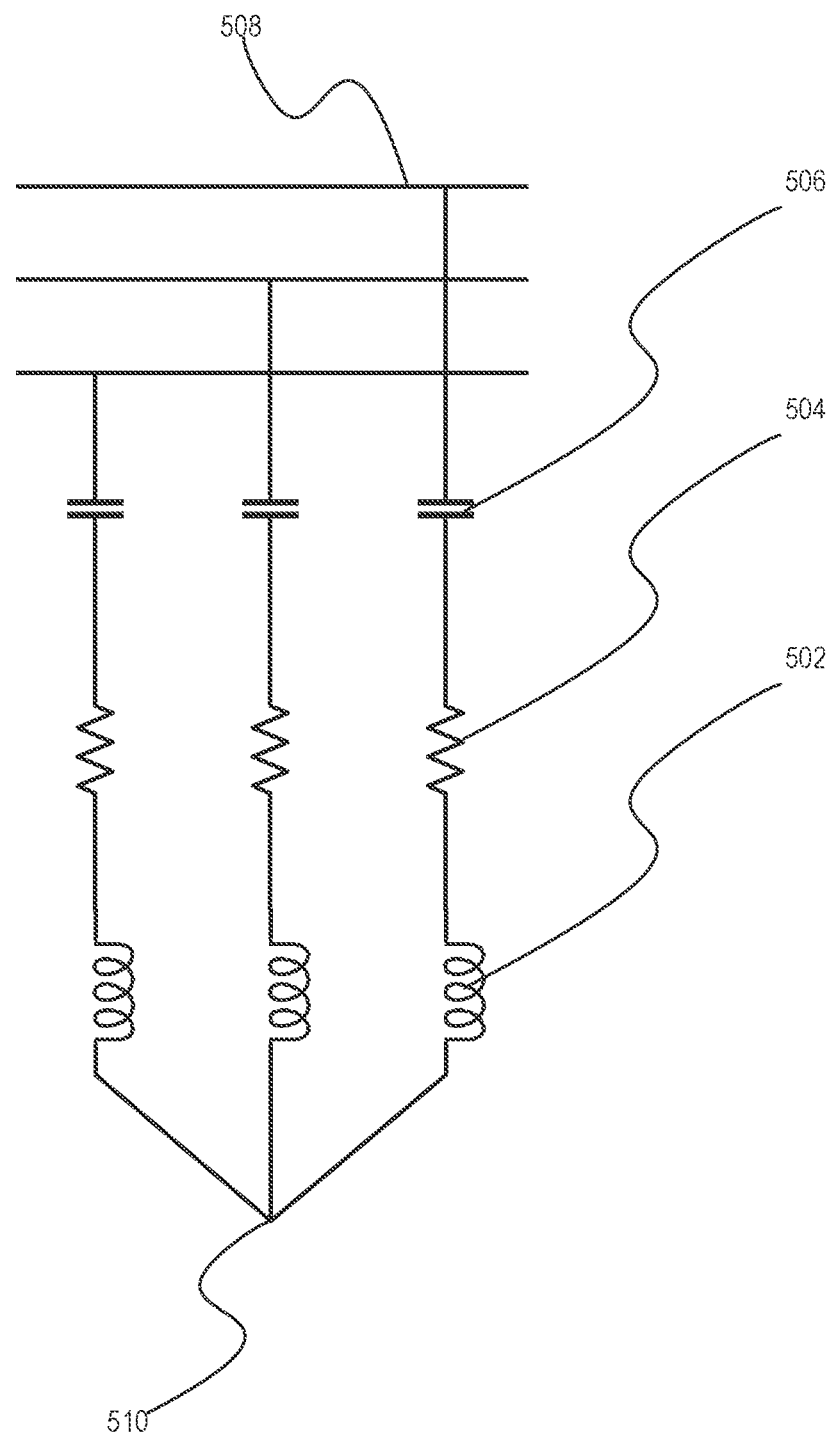
FIG. 5 depicts an example circuit for the power inductive coupling of FIG. 3, according to some embodiments.

FIG. 5 depicts an example circuit for the power inductive coupling of FIG. 3, according to some embodiments. In FIG. 5, primary inductive coils 502 inside the cable terminus or extension of the inductive power coupling are connected to a phase 508 and to a wye-point 510. One or more resistors 504 and capacitors 506 may be combined to provide power frequency conditioning and transient buffering, respectively. The circuit may include various electrical components, such as a low pass/high pass filter, that conditions the power transferred out of the primary coils.

Figure 6:
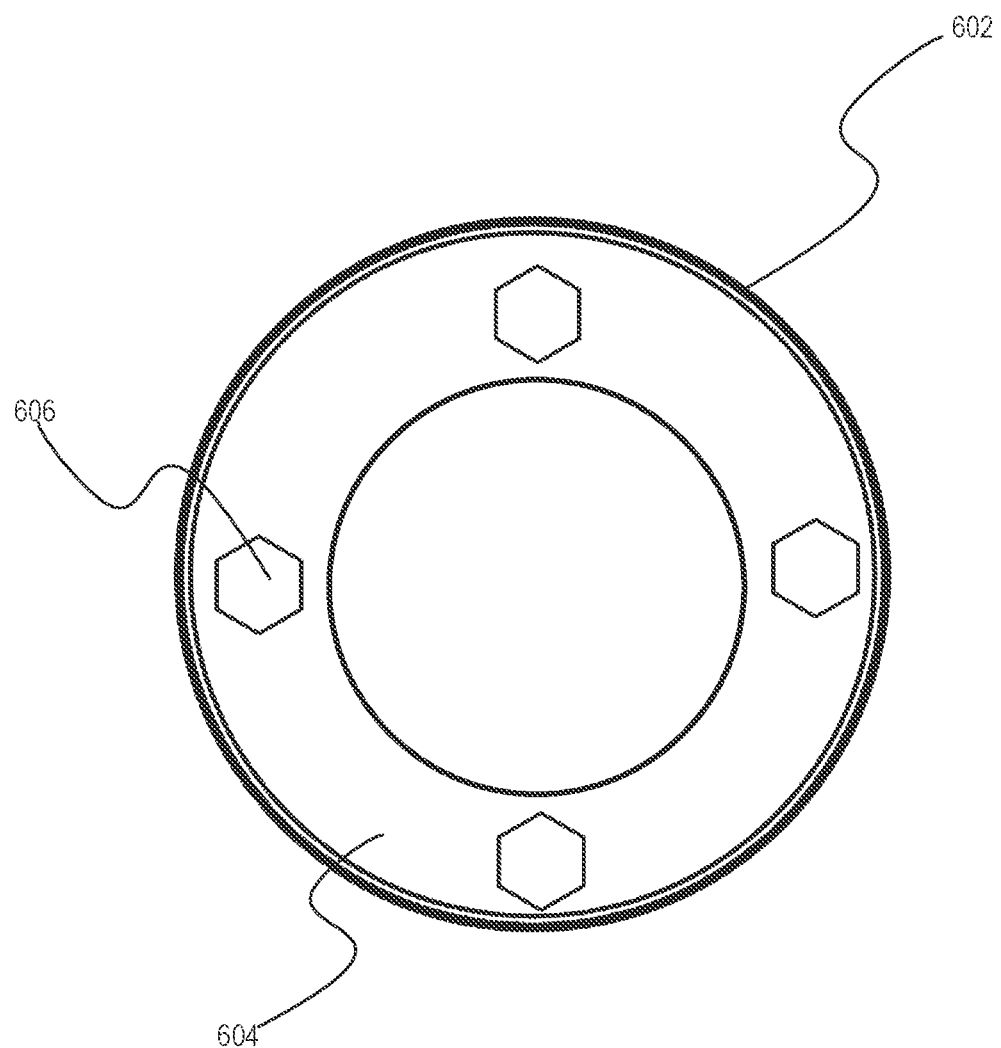
FIG. 6 depicts an axial cross-sectional view of an example provision for attaching a terminus to motor extension using a bolt and flange system, according to some embodiments.
Figure 7:
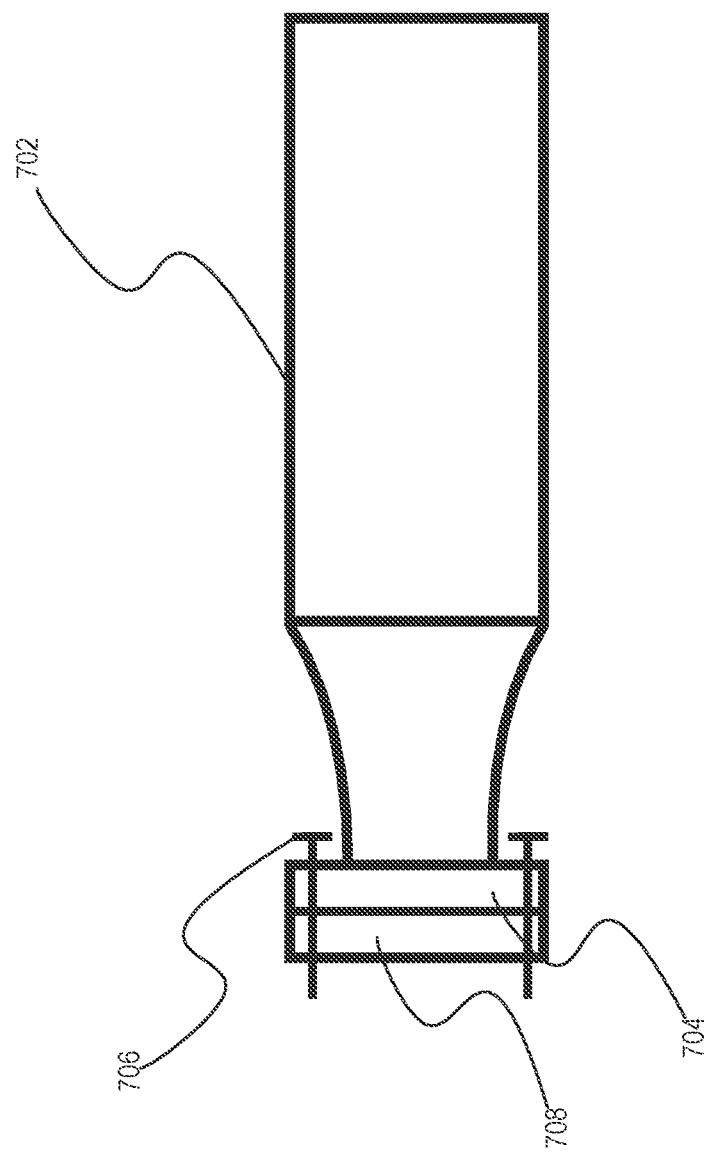
FIG. 7 depicts a side view of an example provision for attaching a terminus to motor extension using a bolt and flange system of FIG. 6, according to some embodiments.

FIG. 6 depicts an axial cross-sectional view of an example provision for attaching a cable terminus to motor extension using a bolt and flange system, according to some embodiments. The exterior of a cable terminus 602 is fitted to a flange 604 and secured to a corresponding flange of the motor end using bolts 606. To further illustrate, FIG. 7 depicts a side view of an example provision for attaching a cable terminus to motor extension using a bolt and flange system of FIG. 6, according to some embodiments. In FIG. 7, a cable terminus 702, a flange 704, and bolts 706 correspond to the cable terminus 602, the flange 604, and the bolts 606 described in FIG. 6. In other embodiments, the flange 704 of the cable terminus may be affixed to a corresponding flange 708 of the motor end using alternate connectors such as rivets or clamps.

Example variations of inductive power coupling of the ESP system are now described. In particular, FIGS. 8-11 depict multiple variations of the ESP system using various embodiments of the inductive power coupling. In some embodiments, the inductive power coupling is fitted not directly to a motor but rather to a tubing. Power can be generated by the inductive coupling at the tubing and delivered to the motor utilizing a motor lead extension.

Figure 8:
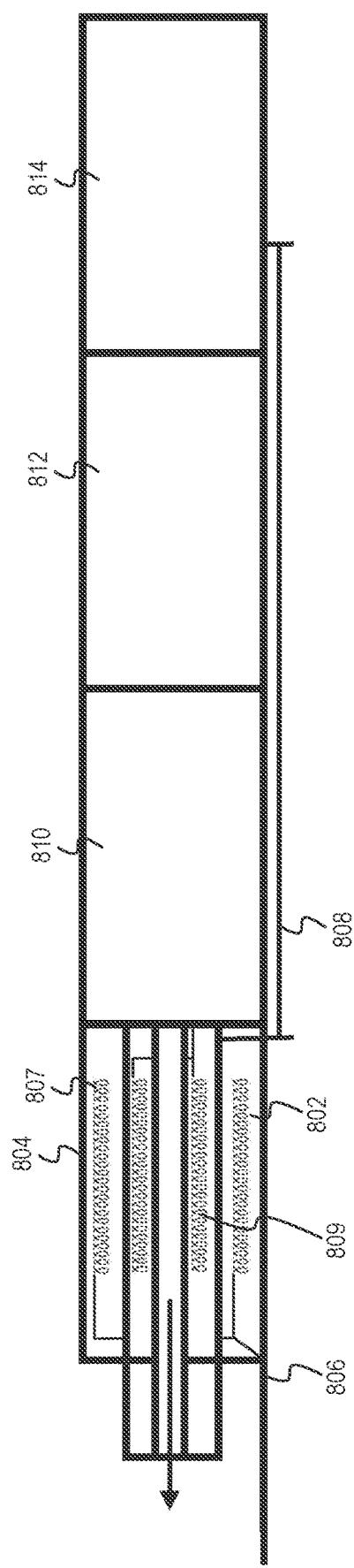
FIG. 8 depicts an example inductive power coupling using a motor lead extension in steam-assisted gravity drainage ("SAGD") ESP system, according to some embodiments.

FIG. 8 depicts an example inductive power coupling using a motor lead extension in steam-assisted gravity drainage ("SAGD") ESP system, according to some embodiments. In SAGD wells, ESP systems are employed horizontally, rather than vertically. In a SAGD well, a pair of horizontal wells can be arranged wherein one well is situated above the other, typically four to six meters above. Water is vaporized into steam above ground and injected into hydrocarbon rich material, such as bitumen-rich oil sands, near the upper of the two horizontal wells. The steam heats the heavy oil such that it flows with gravity into the bottom horizontal well. The bottom horizontal contains a horizontally arranged ESP system, which lifts the oil to the surface of the well. The fluid can enter the ESP assembly at the pump intake and can be pumped to the surface through production tubing. The inductive power coupling is integrated into a production tubing 802 up the well from a motor 814 and electrically connected to the motor 814 via a motor lead extension 808. The production tubing 802 can include inductive coil assemblies ("pickup coils") 809 inside a sealed cylindrical casing as a part of the tubing wall or disposed around the tubing wall. The production tubing 802 is routed through the center space of a cable terminus 804 of the inductive power coupling. The cable terminus 804 is analogous to that described FIG. 2 and can include multiple inductive coil assemblies, primary coils 807, housed inside the cylindrical sealed case of the cable terminus 804. An ESP cable 806 runs from the surface to the cable terminus 804 of the inductive coupling and supplies power to the primary coils 807. The cable terminus 804 is fitted over the production tubing 802 in close proximity to match the primary coils 807 inside the cable terminus 806 and the pickup coils 809 inside the production tubing 802 to generate current in the pickup coils 809 through induction. In order to function properly, the electrical motor should be protected from well fluid ingress, and thus a seal section is typically located between the pump intake and the electric motor to provide a fluid barrier between the well fluid and motor. To deliver power, the motor lead extension 808, which may be of a traditional type or an encapsulated, integral configuration, runs past an electrical submersible pump 810 and a seal section 812 to connect to the motor 814 via a plug, tape, or other integral connectors. In some embodiments, there may be a plurality of pumps, seal sections, and motors between the cable terminus 804 and the motor 814 connected by the motor lead extension 808.

Figure 9:
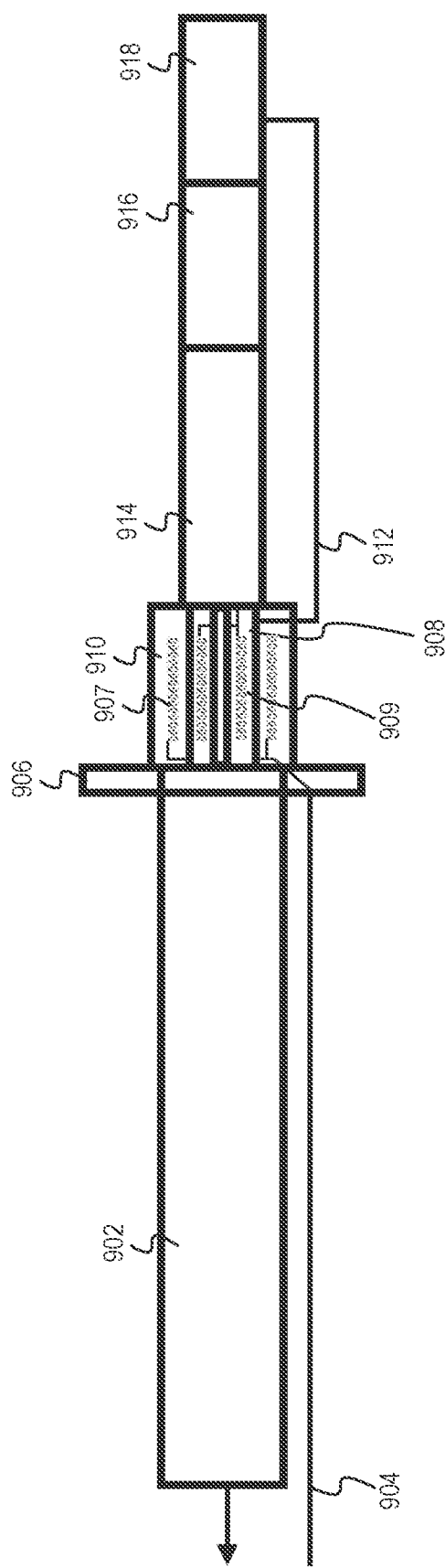
FIG. 9 depicts an example inductive power coupling with terminus connected to the production tubing and mated with the motor terminus to allow separate ESP system deployment and retrieval, according to some embodiments.

FIG. 9 depicts an example inductive power coupling with cable terminus connected to the production tubing and mated with the motor cable terminus to allow separate ESP system deployment and retrieval, according to some embodiments. In FIG. 9, a production tubing 902, ESP cable 904, packer 906, and cable terminus 910 can be permanently deployed into a well. In some embodiments the packer 906 is replaced by alternate supporting elements, such as a liner hanger. The cable terminus 910 is analogous to cable terminus of FIG. 8 and contains primary coils 907 that are connected to the ESP cable 904. Similar to the ESP system of FIG. 8, the ESP system of FIG. 9 is comprised of one or more motors 918, one or more seal sections 916, and one or more pumps 914. The inductive power coupling in FIG. 9, unlike that of FIG. 8, is comprised of an internal inductor coupling component 908 connected to the pump 914 that may be deployed as part of the ESP system. The inductor coupling component 908 is analogous to the extension of the downhole motor of FIG. 2 and contains pickup coils 909. A motor lead extension 912 connects the internal inductor coupling component 908 to the motor 918 to power the ESP system. The 908 ESP system equipped with internal inductor coupling component 908 can be deployed by wireline, slickline, coiled tubing, or other ESP deployment methods. The cable terminus 910 and the internal inductor coupling component 908 provides an inductive power coupling that is completely sealed against wellbore fluid once the ESP string is seated in the packer 906 or other supporting element.

Figure 10:
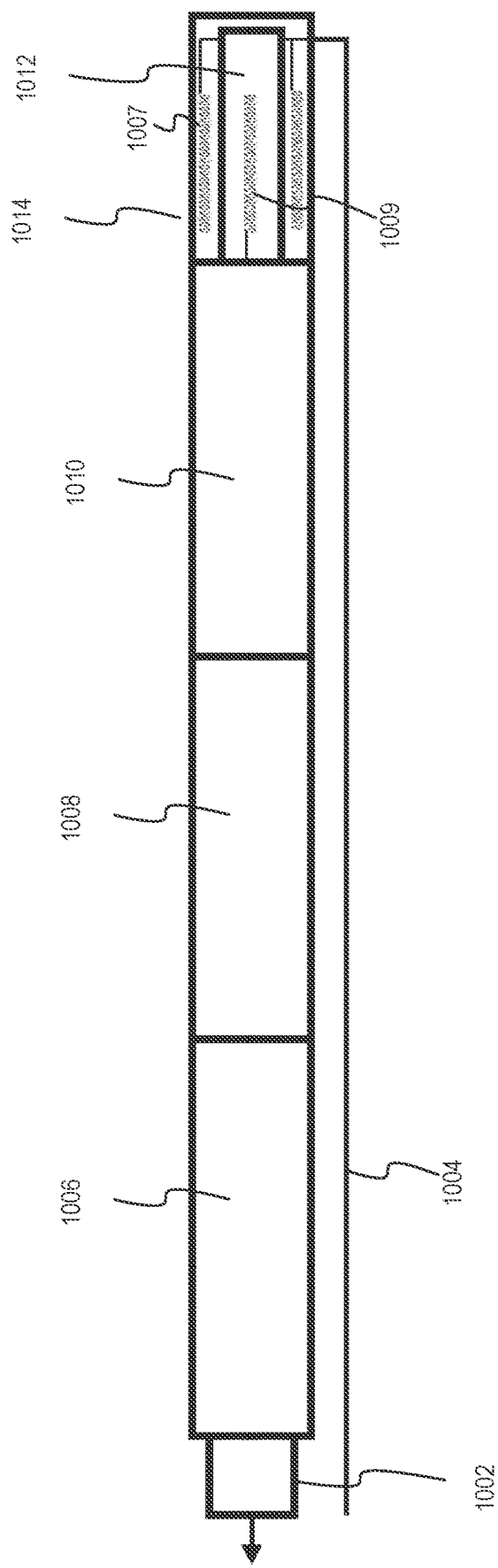
FIG. 10 depicts an example inductive power coupling with terminus and extension on the bottom end of an ESP motor, according to some embodiments.

An inductive power coupling may not only be place in the head or the upstream end of an ESP motor, as described in FIG. 2, but also at the bottom of the motor. FIG. 10 depicts an example inductive power coupling with cable terminus and extension on the bottom end of an ESP motor, according to some embodiments. In FIG. 10 a cable terminus 1014 surrounds an extension 1012 of the ESP motor analogous to that of FIG. 2 containing primary coils 1007. The extension 1012 containing the pickup coils 1009 however is disposed on the lower end of the ESP system further along the wellbore instead of on the upstream end. An ESP cable 1004 runs past a production tubing 1002, one or more pumps 1006, one or more seal sections 1008, and one or more motors 1010 to connect to the cable terminus 1014.

Figure 11:
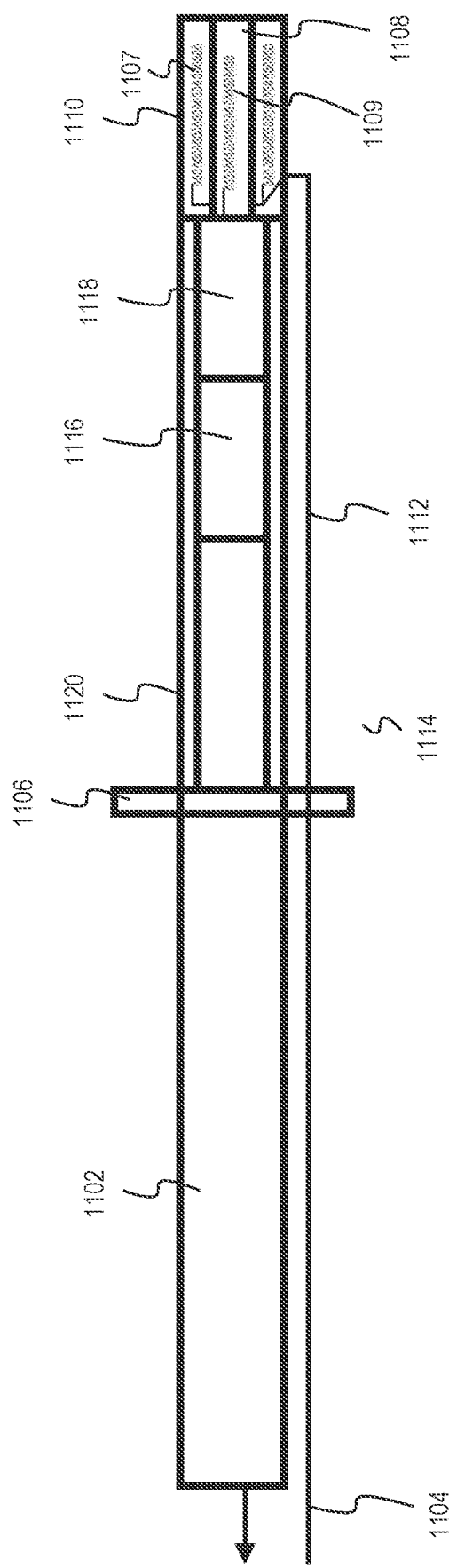
FIG. 11 depicts an example inductive power coupling with extension on the bottom end of an ESP motor and mated with a cable terminus to allow separate ESP system deployment and retrieval, according to some embodiments.

FIG. 11 depicts an example inductive power coupling with extension on the bottom end of an ESP motor and mated with a cable terminus to allow separate ESP system deployment and retrieval, according to some embodiments. In FIG. 11, a production tubing 1102, ESP cable 1104, and packer 1106 are permanently deployed inside the well. In some embodiments, the packer 1106 is replaced by alternate supporting elements, such as a liner hanger. The ESP cable 1104 penetrates through the packer 1106 and connects to a cable terminus 1110 and the primary coils 1107 inside. The cable terminus 1110 is supported by support members 1120 which connect the cable terminus 1110 to the packer 1106. The support members 1120 do not completely encapsulate any deployed ESP system. The ESP system can be comprised of one or more pumps 1114, one or more seal sections 1116, and one or more motors 1118, and an extension 1108 on the bottom end of the ESP motor analogous to that of FIG. 10 containing the pickup coils 1109. The ESP system can be deployed via wireline, slickline, coiled tubing, or other ESP deployment methods and seats into the permanently deployed components. The discharge element of the pump 1114 seats into the packer 1106 and the motor end 1108 forms a sealed, inductive power coupling with the cable terminus 1110.

Figure 12:
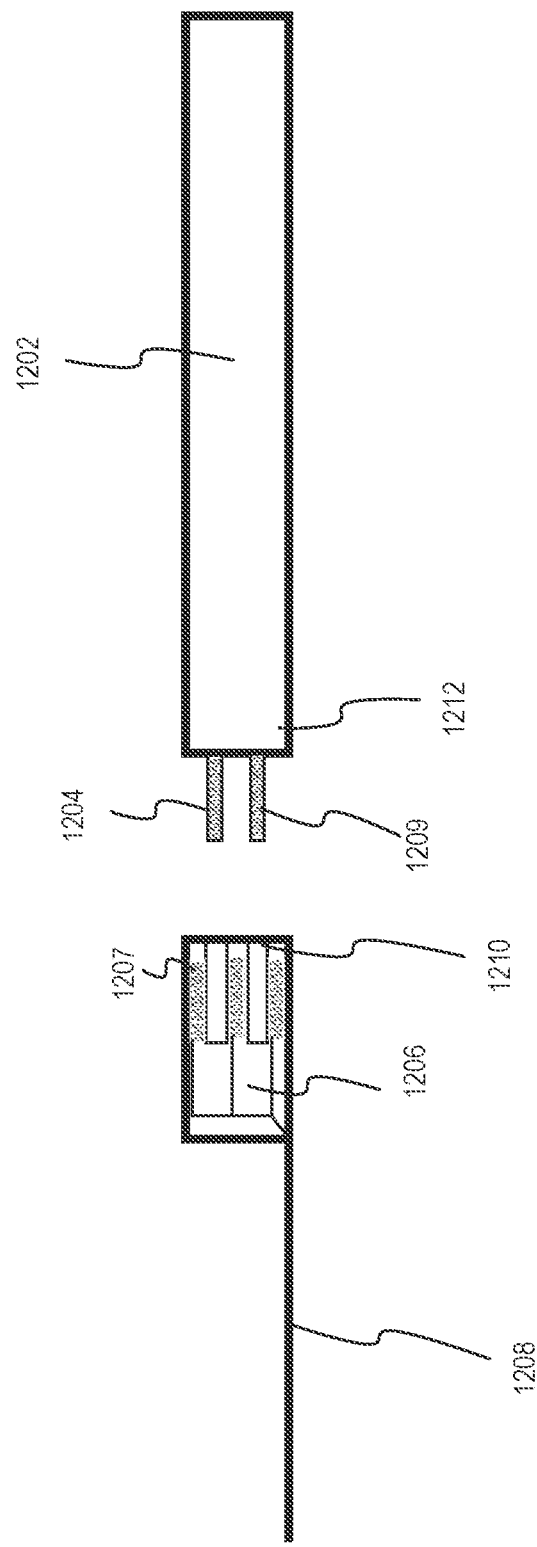
FIG. 12 depicts a side view of an inductive power coupling having concentric coil-within-coil arrangement of the terminus and the extension, according to some embodiments.

In additional to variations in the placement and integration of the inductive power coupling, there are multiple variations in the manner in which the cable terminus and extension are fitted together beside the concentric cylinder design of FIG. 2 (wherein the inductive coils are disposed side by side). FIG. 12 depicts a side view of an inductive power coupling having concentric coil-within-coil arrangement of the cable terminus and the extension. In FIG. 12, an ESP motor 1202 has an extension 1204 comprised of a base 1212 and multiple coil-containing rods that pair with a cable terminus 1206 having receptors 1210 for the insertion of the rods of the extension 1204. The cable terminus and the extension contain primary coil 207 and pickup coil 1209 similar to that of FIG. 2 allow transfer of power through induction. The ESP cable 1208 is attached to the cable terminus 1206 and can provide power to the primary coil 1207.

Figure 13:
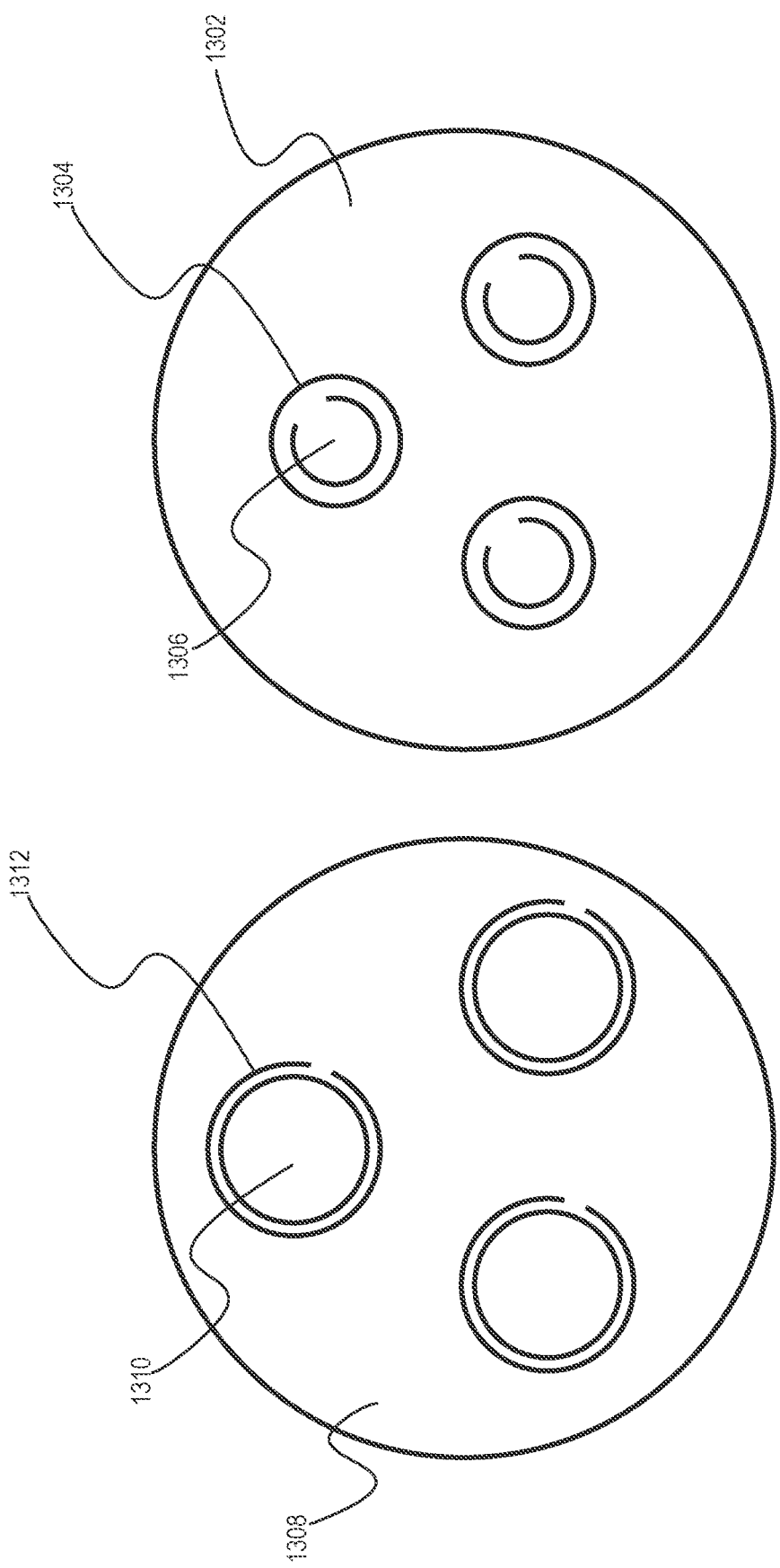
FIG. 13 depicts a cross sectional view of inductive power coupling having concentric coil-within-coil arrangement of the terminus and the extension, according to some embodiments.

FIG. 13 depicts a cross sectional view of inductive power coupling having concentric coil-within-coil arrangement of a cable terminus and an extension, according to some embodiments. A motor end base 1302 supports multiple rods 1304 containing pickup coils 1306 within. A cable terminus 1308 has multiple receptors 1310 that allow insertion of rods from the motor end 1304. Primary coils 1312 are placed around the receptors 1310 and are powered by an ESP cable. Within the cable terminus and around the perimeter of the receptors are inductive coils arranged such that when the rods are inserted into the receptors, the inductive coils within the rods are paired with inductive coils surrounding the receptors in a concentric coil inside coil formation. The arrangement described in FIG. 13 may be reversed with the rods on the cable terminus and the receptors located in the motor end.

Example Operations

Figure 14:
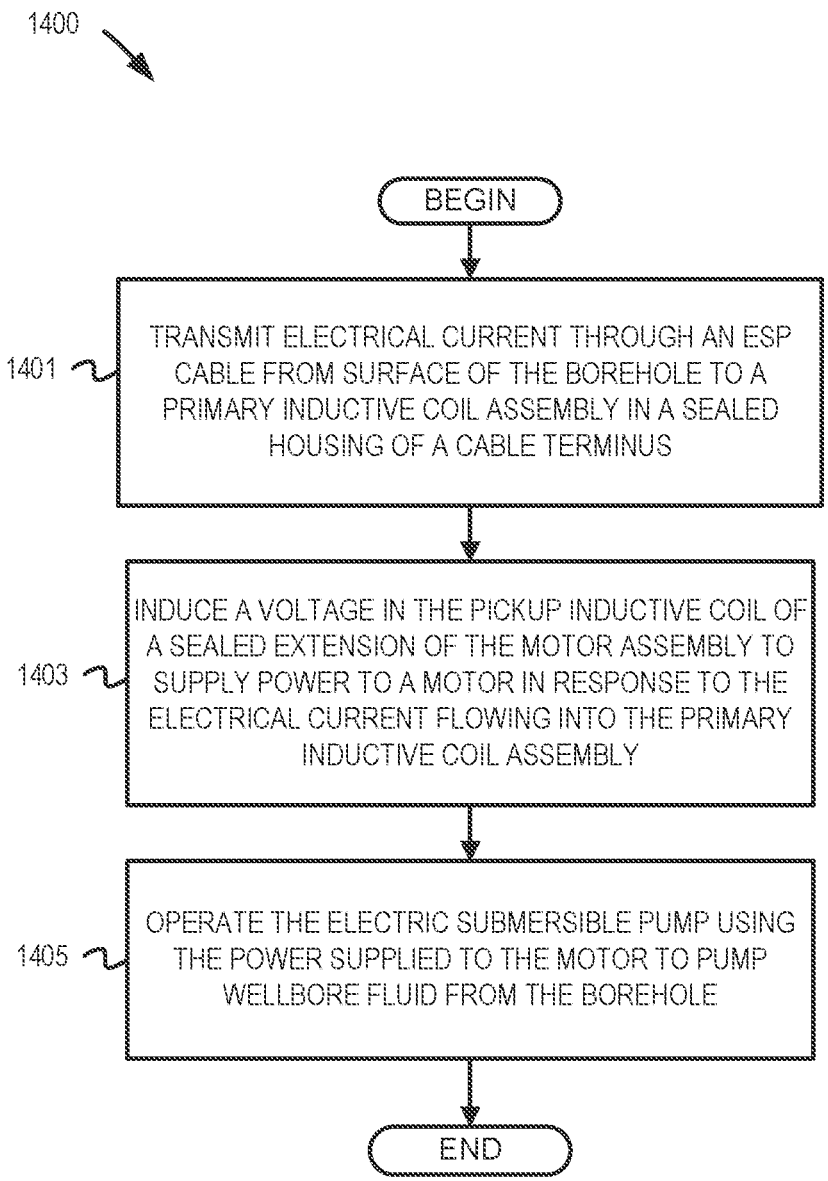
FIG. 14 depicts a flowchart of an example operations of using inductive power coupling for an electric submersible pump, according to some embodiments.

FIG. 14 depicts a flowchart of an example operations of using inductive power coupling for an electric submersible pump, according to some embodiments. A flowchart 1400 depicts example operations of using inductive power coupling for any of the above example configurations. Operations begin at block 1401.

At block 1401, electrical current is transmitted through an ESP cable from the surface of a borehole and electrically coupled to a sealed housing of a cable terminus. The ESP cable is further coupled with a primary inductive coil assembly in the cable terminus. The ESP and the inductive power coupling may contain multiple components as introduced in various embodiments of the ESP assembly described above.

At block 1403, a voltage is induced in a pickup inductive coil assembly positioned in a sealed extension of the motor. The voltage is induced by the electrical current transmitted through the ESP cable at block 1401. The primary and pickup inductive coil assemblies are arranged in such a way as to allow the electrical current of the primary inductive coil assembly to induce a voltage in the pickup inductive coil. Various arrangements of the inductive coil assemblies are described in embodiments of the inductive coupling above.

At block 1405, the ESP is operated to pump fluids from the borehole based on the inductive power coupling.

EXAMPLE EMBODIMENTS

Embodiment 1

An apparatus comprising: an electric submersible pump having a motor, the electric submersible pump to pump wellbore fluid from a borehole during operation, wherein the motor comprises a sealed extension that houses a pickup inductive coil assembly; a cable terminus that comprises a primary inductive coil assembly in a sealed housing; and a power cable to electrically couple a power source at a surface of the borehole to the primary inductive coil assembly in the sealed housing, wherein the primary inductive coil assembly is positioned relative to the pickup inductive coil assembly such that an electrical current flowing in the primary inductive coil assembly from the power source and through the power cable is to induce a voltage in the pickup inductive coil assembly to supply power to the motor.

Embodiment 2

The apparatus of Embodiment 1, wherein the sealed extension of the motor is connected to a production tubing that is to run from the surface of the borehole to the electric submersible pump such that sealed extension of the motor is positioned in the sealed housing of the cable terminus and such that the pickup inductive coil assembly is adjacent to the primary inductive coil assembly.

Embodiment 3

The apparatus of Embodiment 1, wherein the cable terminus is connected to a production tubing that is to run from the surface of the borehole such that sealed extension of the motor is positioned in the sealed housing of the cable terminus and such that the pickup inductive coil assembly is adjacent to the primary inductive coil assembly.

Embodiment 4

The apparatus of Embodiment 3, wherein the electric submersible pump and the motor are to be deployed in the borehole by at least one of a wireline, a slickline, and a coiled tubing.

Embodiment 5

The apparatus of Embodiments 3 or 4, further comprising a packer positioned over the production tubing and the cable terminus, wherein the sealed extension of the motor of the electric submersible pump is seated in the packer.

Embodiment 6

The apparatus of Embodiment 1, wherein the motor and the sealed extension that houses the pickup inductive coil assembly is positioned at a lower end of the electric submersible pump relative to the surface of the borehole.

Embodiment 7

The apparatus of Embodiment 6, wherein the motor is positioned above the sealed extension and the electric submersible pump is positioned above the motor relative to the surface of the borehole.

Embodiment 8

The apparatus of Embodiment 7, further comprising a seal section positioned between the motor and the electric submersible pump.

Embodiment 9

The apparatus of any one of Embodiments 1, 6, 7, and 8, wherein the electric submersible pump is connected to a production tubing that runs from the surface of the borehole to the electric submersible pump.

Embodiment 10

The apparatus of Embodiment 1, wherein the motor and the sealed extension that houses the pickup inductive coil assembly is positioned at a lower end of the electric submersible pump relative to the surface of the borehole, wherein the electric submersible pump and the motor are to be deployed in the borehole by at least one of a wireline, a slickline, and a coiled tubing, wherein the cable terminus is connected to a production tubing that is to run from the surface of the borehole such that sealed extension of the motor is positioned in the sealed housing of the cable terminus and such that the pickup inductive coil assembly is adjacent to the primary inductive coil assembly, and wherein the power cable is to penetrate a packer positioned at an end of the production tubing in the borehole and connects to the primary inductive coil assembly in the cable terminus.

Embodiment 11

The apparatus of any one of Embodiments 1-10, wherein the pickup inductive coil assembly comprises at least one rod that includes a pickup inductive coil, wherein the primary inductive coil assembly comprises a primary inductive coil positioned around at least one receptor, wherein the at least one rod is inserted into the at least one receptor.

Embodiment 12

A method comprising: supplying power to a motor of an electric submersible pump in a borehole, wherein supplying the power comprises transmitting an electrical current through a power cable running from a surface of the borehole and electrically coupled to a primary inductive coil assembly in a sealed housing of a cable terminus, wherein a pickup inductive coil assembly is positioned in a sealed extension of the motor and electrically coupled to the motor, such that the electrical current in the primary inductive coil assembly is to induce a voltage in the pickup inductive coil assembly to supply power to the motor in response to the electrical current flowing into the primary inductive coil assembly; and operating the electric submersible pump using the power supplied to the motor to pump wellbore fluid from the borehole.

Embodiment 13

The method of Embodiment 12, wherein the sealed extension of the motor is connected to a production tubing that is to run from the surface of the borehole to the electric submersible pump such that sealed extension of the motor is positioned in the sealed housing of the cable terminus and such that the pickup inductive coil assembly is adjacent to the primary inductive coil assembly.

Embodiment 14

The method of Embodiment 12, wherein the cable terminus is connected to a production tubing that is to run from the surface of the borehole such that sealed extension of the motor is positioned in the sealed housing of the cable terminus and such that the pickup inductive coil assembly is adjacent to the primary inductive coil assembly.

Embodiment 15

The method of Embodiment 14, wherein the electric submersible pump and the motor are to be deployed in the borehole by at least one of a wireline, a slickline, and a coiled tubing.

Embodiment 16

The method of Embodiments 14 or 15, wherein a packer positioned over the production tubing and the cable terminus, and wherein the sealed extension of the motor of the electric submersible pump is seated in the packer.

Embodiment 17

The method of Embodiment 12, wherein the motor and the sealed extension that houses the pickup inductive coil assembly is positioned at a lower end of the electric submersible pump relative to the surface of the borehole.

Embodiment 18

The method of Embodiment 17, wherein the motor is positioned above the sealed extension and the electric submersible pump is positioned above the motor relative to the surface of the borehole.

Embodiment 19

The method of Embodiment 18, wherein a seal section is positioned between the motor and the electric submersible pump.

Embodiment 20

The method of any one of Embodiments 12, 17, 18, and 19, wherein the electric submersible pump is connected to a production tubing that runs from the surface of the borehole to the electric submersible pump.

Embodiment 21

The method of Embodiment 12, wherein the motor and the sealed extension that houses the pickup inductive coil assembly is positioned at a lower end of the electric submersible pump relative to the surface of the borehole, wherein the electric submersible pump and the motor are to be deployed in the borehole by at least one of a wireline, a slickline, and a coiled tubing, wherein the cable terminus is connected to a production tubing that is to run from the surface of the borehole such that sealed extension of the motor is positioned in the sealed housing of the cable terminus and such that the pickup inductive coil assembly is adjacent to the primary inductive coil assembly, and wherein the power cable is to penetrate a packer positioned at an end of the production tubing in the borehole and connects to the primary inductive coil assembly in the cable terminus.

Embodiment 22

The method of any one of Embodiments 12-21, wherein the pickup inductive coil assembly comprises at least one rod that includes a pickup inductive coil, wherein the primary inductive coil assembly comprises a primary inductive coil positioned around at least one receptor, wherein the at least one rod is inserted into the at least one receptor.

While the aspects of the disclosure are described with reference to various implementations and exploitations, it will be understood that these aspects are illustrative and that the scope of the claims is not limited to them. In general, the inductive power coupling may be implemented with many variations, modifications, additions, and improvements.

Plural instances may be provided for components or structures described herein as a single instance. Finally, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:
1. An apparatus comprising:
an electric submersible pump having a motor, the electric submersible pump to pump wellbore fluid from a borehole during operation, wherein the motor comprises a sealed extension that houses a pickup inductive coil assembly;
a cable terminus that comprises a primary inductive coil assembly in a sealed housing, wherein the sealed extension of the motor is positioned in the sealed housing of the cable terminus such that the pickup inductive coil assembly is adjacent to the primary inductive coil assembly; and
a power cable to electrically couple a power source at a surface of the borehole to the primary inductive coil assembly in the sealed housing, wherein an electrical current flowing in the primary inductive coil assembly from the power source and through the power cable is to induce a voltage in the pickup inductive coil assembly to supply power to the motor.

2. The apparatus of claim 1, wherein the sealed extension of the motor is connected to a production tubing that is to run from the surface of the borehole to the electric submersible pump.

3. The apparatus of claim 1, wherein the cable terminus is connected to a production tubing that is to run from the surface of the borehole.

4. The apparatus of claim 3, wherein the electric submersible pump and the motor are to be deployed in the borehole by at least one of a wireline, a slickline, and a coiled tubing.

5. The apparatus of claim 3, further comprising a packer positioned over the production tubing and the cable terminus, wherein the sealed extension of the motor of the electric submersible pump is seated in the packer.

6. The apparatus of claim 1, wherein the motor and the sealed extension that houses the pickup inductive coil assembly is positioned at a lower end of the electric submersible pump relative to the surface of the borehole.

7. The apparatus of claim 6, wherein the motor is positioned above the sealed extension and the electric submersible pump is positioned above the motor relative to the surface of the borehole.

8. The apparatus of claim 7, further comprising a seal section positioned between the motor and the electric submersible pump.

9. The apparatus of claim 8, wherein the electric submersible pump is connected to a production tubing that runs from the surface of the borehole to the electric submersible pump.

10. The apparatus of claim 1,
wherein the motor and the sealed extension that houses the pickup inductive coil assembly is positioned at a lower end of the electric submersible pump relative to the surface of the borehole,
wherein the electric submersible pump and the motor are to be deployed in the borehole by at least one of a wireline, a slickline, and a coiled tubing,
wherein the cable terminus is connected to a production tubing that is to run from the surface of the borehole, and
wherein the power cable is to penetrate a packer positioned at an end of the production tubing in the borehole and connects to the primary inductive coil assembly in the cable terminus.

11. The apparatus of claim 1, wherein the pickup inductive coil assembly comprises at least one rod that includes a pickup inductive coil, wherein the primary inductive coil assembly comprises a primary inductive coil positioned around at least one receptor, wherein the at least one rod is inserted into the at least one receptor.

12. A method comprising:
supplying power to a motor of an electric submersible pump in a borehole,
wherein supplying the power comprises transmitting an electrical current through a power cable running from a surface of the borehole and electrically coupled to a primary inductive coil assembly in a sealed housing of a cable terminus,
wherein a pickup inductive coil assembly is positioned in a sealed extension of the motor and electrically coupled to the motor, and wherein the sealed extension of the motor is positioned in the sealed housing of the cable terminus such that the pickup inductive coil assembly is adjacent to the primary inductive coil assembly such that the electrical current in the primary inductive coil assembly is to induce a voltage in the pickup inductive coil assembly to supply power to the motor in response to the electrical current flowing into the primary inductive coil assembly; and
operating the electric submersible pump using the power supplied to the motor to pump wellbore fluid from the borehole.

13. The method of claim 12, wherein the sealed extension of the motor is connected to a production tubing that is to run from the surface of the borehole to the electric submersible pump.

14. The method of claim 12, wherein the cable terminus is connected to a production tubing that is to run from the surface of the borehole.

15. The method of claim 14, wherein the electric submersible pump and the motor are to be deployed in the borehole by at least one of a wireline, a slickline, and a coiled tubing.

16. The method of claim 14, wherein a packer positioned over the production tubing and the cable terminus, and wherein the sealed extension of the motor of the electric submersible pump is seated in the packer.

17. The method of claim 12, wherein the motor and the sealed extension that houses the pickup inductive coil assembly is positioned at a lower end of the electric submersible pump relative to the surface of the borehole.

18. The method of claim 17, wherein the motor is positioned above the sealed extension and the electric submersible pump is positioned above the motor relative to the surface of the borehole.

19. The method of claim 18, wherein a seal section is positioned between the motor and the electric submersible pump.

20. The method of claim 19, wherein the electric submersible pump is connected to a production tubing that runs from the surface of the borehole to the electric submersible pump.

21. The method of claim 12,
wherein the motor and the sealed extension that houses the pickup inductive coil assembly is positioned at a lower end of the electric submersible pump relative to the surface of the borehole,
wherein the electric submersible pump and the motor are to be deployed in the borehole by at least one of a wireline, a slickline, and a coiled tubing,
wherein the cable terminus is connected to a production tubing that is to run from the surface of the borehole, and
wherein the power cable is to penetrate a packer positioned at an end of the production tubing in the borehole and connects to the primary inductive coil assembly in the cable terminus.

22. The method of claim 12, wherein the pickup inductive coil assembly comprises at least one rod that includes a pickup inductive coil, wherein the primary inductive coil assembly comprises a primary inductive coil positioned around at least one receptor, wherein the at least one rod is inserted into the at least one receptor.

* * * * *